United States Patent [19]

Golden

[11] Patent Number: 4,842,774

[45] Date of Patent: Jun. 27, 1989

[54] PYRAMIDING TUMULI WASTE DISPOSAL SITE AND METHOD OF CONSTRUCTION THEREOF

[75] Inventor: Martin P. Golden, Hamburg, N.Y.

[73] Assignee: The United States of America as represented by the United States Department of Energy, Washington, D.C.

[21] Appl. No.: 83,756

[22] Filed: Aug. 7, 1987

[51] Int. Cl.[4] .................. G21F 9/12; G21F 9/24; G21F 5/00; B09B 1/00
[52] U.S. Cl. .................. 252/633; 250/506.1; 250/507.1; 250/515.1; 405/55; 405/128; 405/129; 405/272; 405/283; 405/284; 405/288
[58] Field of Search .............. 250/507.1, 506.1, 515.1; 405/128, 129, 272, 274, 282, 283, 284, 288, 36, 53, 55; 252/633; 52/169.6

[56] References Cited

U.S. PATENT DOCUMENTS

| | | | |
|---|---|---|---|
| 4,166,709 | 9/1979 | Valiga | 405/128 |
| 4,350,461 | 9/1982 | Valiga et al. | 405/128 |
| 4,352,601 | 10/1982 | Valiga et al. | 405/270 |
| 4,362,434 | 12/1982 | Valiga et al. | 405/128 |
| 4,375,930 | 3/1983 | Valiga | 405/128 |
| 4,415,459 | 11/1983 | Coffman et al. | 210/747 |
| 4,464,081 | 8/1984 | Hillier et al. | 405/128 |
| 4,483,641 | 11/1984 | Stoll | 405/129 |
| 4,580,925 | 4/1986 | Matich et al. | 405/128 |
| 4,592,846 | 7/1986 | Metzger et al. | 405/129 |
| 4,681,706 | 7/1987 | Mallory et al. | 252/633 |
| 4,701,280 | 10/1987 | Canevall | 252/633 |
| 4,705,429 | 11/1987 | Notale | 405/128 |
| 4,713,199 | 12/1987 | Spilker et al. | 252/633 |

OTHER PUBLICATIONS

DOE Publication No. EA-0295 Entitled "Environmental Assessment for Disposal or Project Low-Level Waste" Dated Apr. 1986.

*Primary Examiner*—Howard J. Locker

[57] ABSTRACT

An improved waste disposal site for the above-ground disposal of low-level nuclear waste as disclosed herein. The disposal site is formed from at least three individual waste-containing tumuli, wherein each tumuli includes a central raised portion bordered by a sloping side portion. Two of the tumuli are constructed at ground level with adjoining side portions, and a third above-ground tumulus is constructed over the mutually adjoining side portions of the ground-level tumuli. Both the floor and the roof of each tumulus includes a layer of water-shedding material such as compacted clay, and the clay layer in the roofs of the two ground-level tumuli form the compacted clay layer of the floor of the third above-ground tumulus. Each tumulus further includes a shield wall, preferably formed from a solid array of low-level handleable nuclear waste packages. The provision of such a shield wall protects workers from potentially harmful radiation when higher-level, non-handleable packages of nuclear waste are stacked in the center of the tumulus.

26 Claims, 5 Drawing Sheets

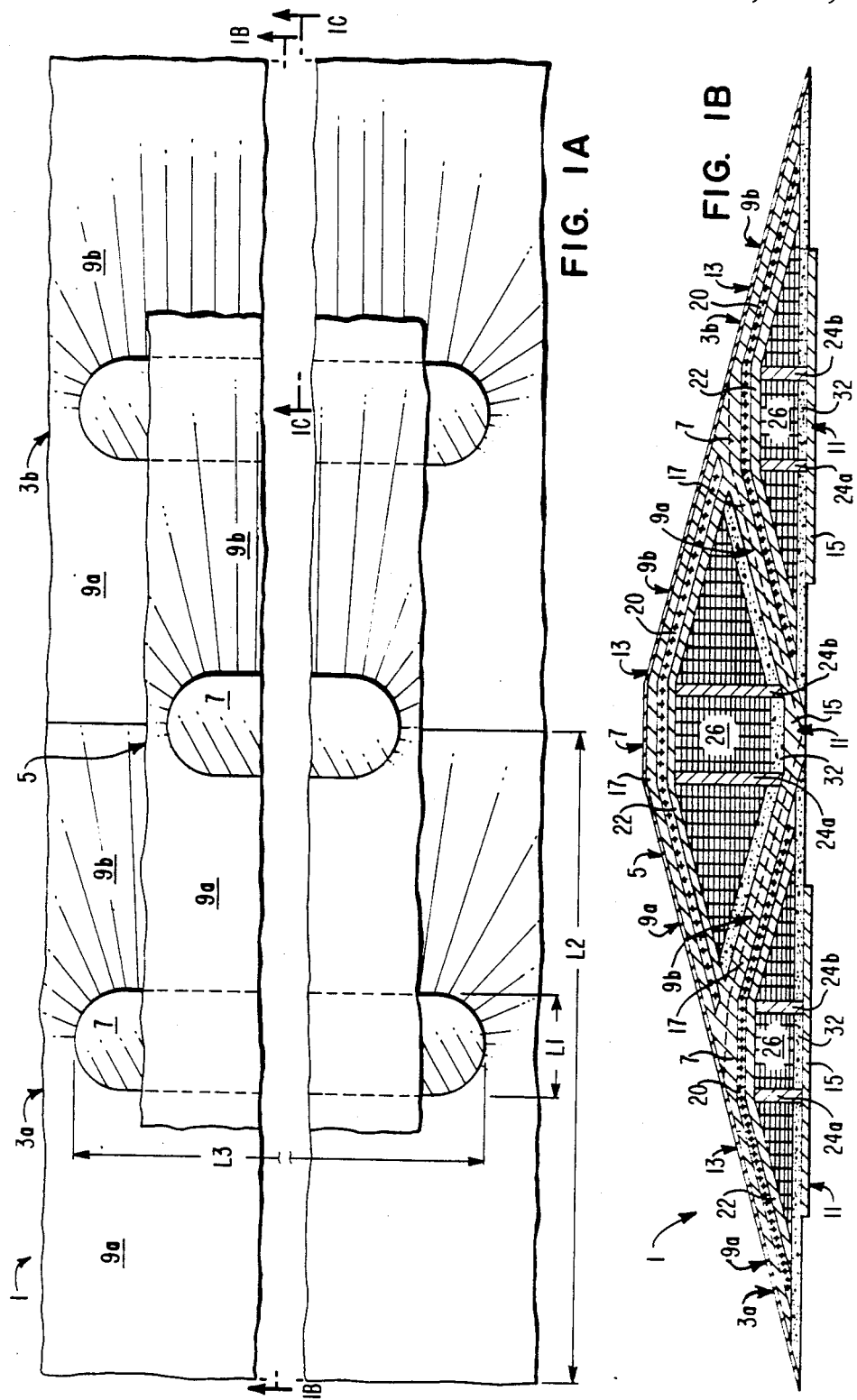

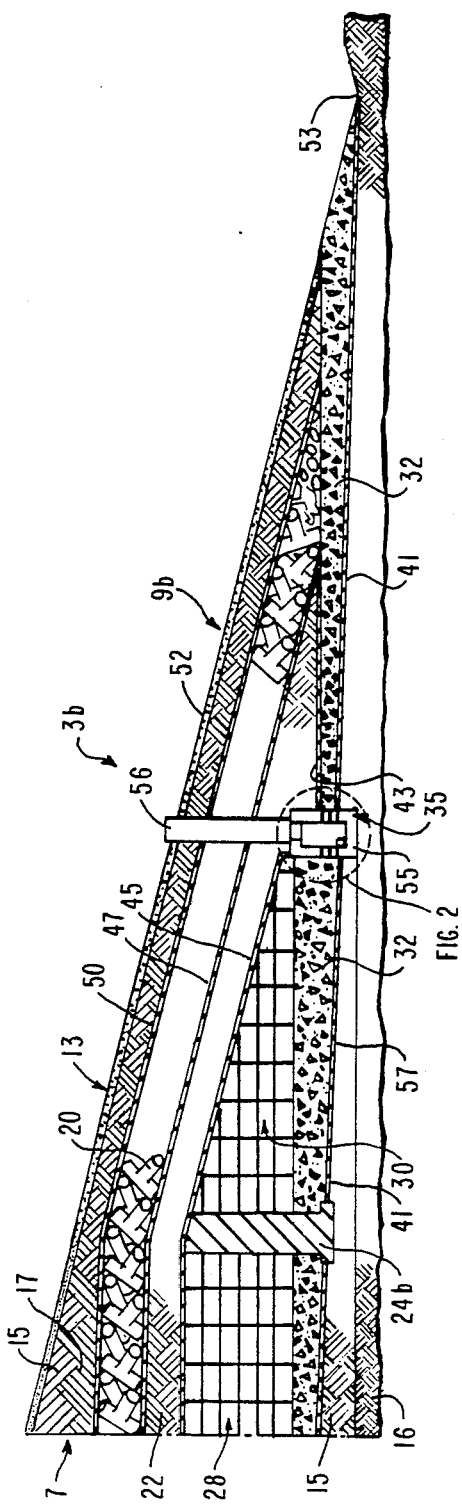

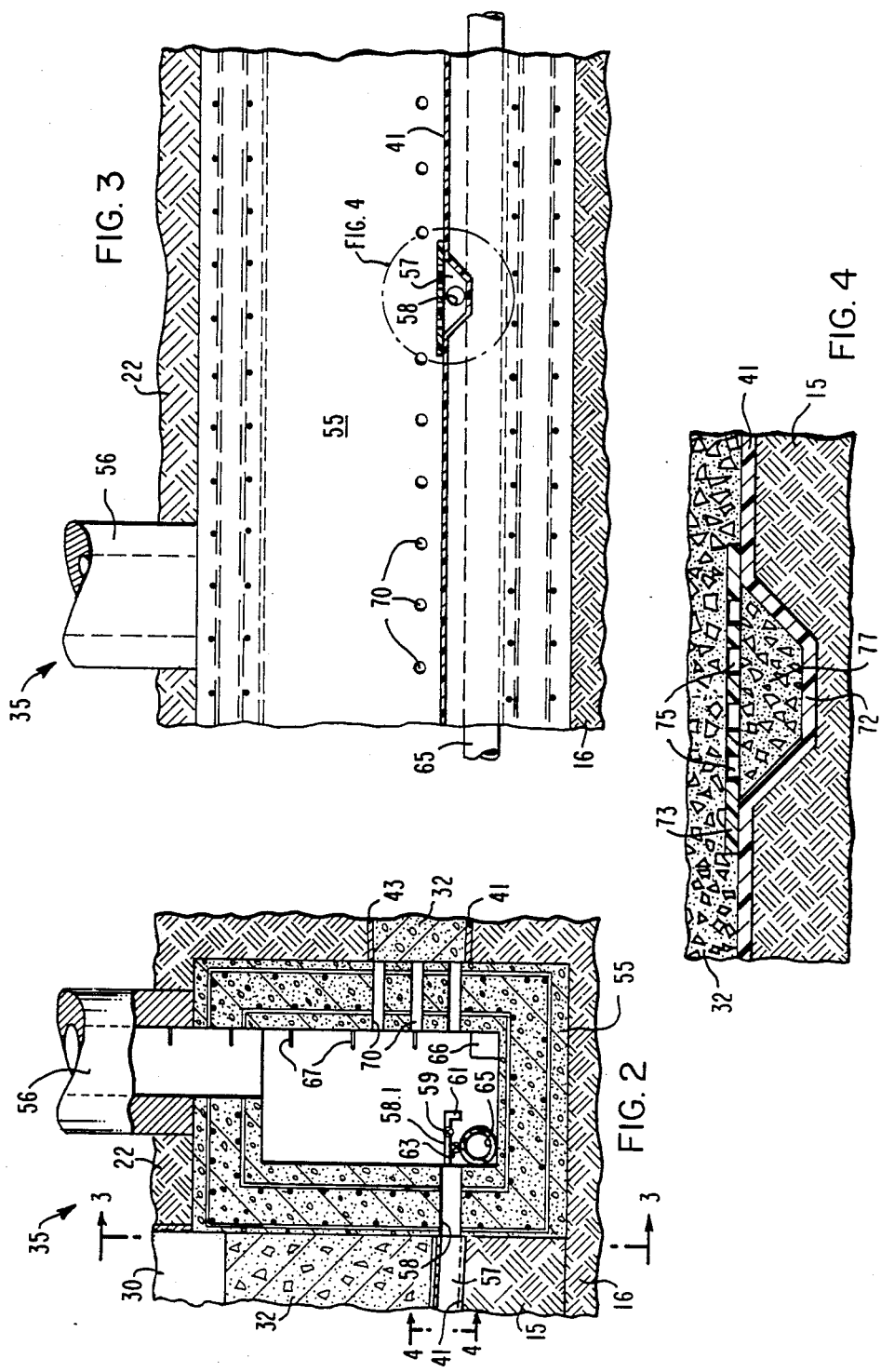

PYRAMIDING TUMULI WASTE DISPOSAL SITE AND METHOD OF CONSTRUCTION THEREOF

BACKGROUND OF THE INVENTION

This invention was conceived in the course of U.S. Department of Energy Contract No. DE-AC07-81NE44139.

This invention generally relates to an improved, above-ground waste disposal site and method of construction thereof. It is particularly adapted for the safe disposal of large quantities of low-level nuclear waste in a site of limited acreage.

As new nuclear plants are put on line, and as the existing nuclear power facilities in the United States have matured, the amount of radioactive waste produced in general has expanded. The largest volume of this waste is what is known as "low-level" waste in the industry, which may be loosely defined as waste having a surface radiation intensity of about 1½ rem per hour or less. Such low-level waste generally comes from waste treatment plants, which separate low-level from high-level wastes, or equipment, cleaning solvents and clothing used in nuclear maintenance operations. As greater volumes of these wastes are produced, the need for safe modes of disposal has increased.

Burial systems for burying nuclear waste are known in the prior art. In the earliest of these systems, such wastes were merely packed into 55-gallon steel drums, dropped into a simple, earthen trench by a long-boom crane, and buried. Unfortunately, such "kick and roll" burial systems turned out to be generally unsatisfactory for the land disposal of nuclear waste. The loose soil with which these trenches were filled in was much more permeable to water than the densely packed soil which formed the sides of the trench, or the dense strata which typically formed the bottom of the trench. Consequently, the relatively loose soil which surrounded these drums encouraged the collection of large amounts of standing water around the drums in what is known as the "bathtub effect". This standing water ultimately caused the steel walls of the drums buried within the trenches to corrode and collapse. The collapsing drums and compaction of the soil over time resulted in a downward movement or subsidence of the soil, which caused a depression to form over the top of the trench. This depression in turn collected surface water and hence worsened the tendency of the trench to collect and maintain a pool of standing water over the drums. The resulting increase in standing water resulted in still more soil subsidence and accelerated the corrosion and collapse of the drums buried therein. The end result was the occurrence of radioactive contamination of the ground water flowing therethrough.

To solve the soil subsidence and water accumulation problem associated with such "kick and roll" disposal sites, a variety of alternative burial systems have been developed. These alternatives include earthen vaults having structurally rigid walls, and container burial sites in which the spaces between the waste containers are filled in with concrete or some other hardenable grout.

While these alternative systems constitute clear advances over the trenches used in the simple, "kick and roll" disposal systems, various shortcomings are associated with both. For example, the rigid walls used in earthen vaults are apt to crack and break in response to a seismic disturbance. Once the integrity of the vault walls is gone, ground water can flow in and accumulate around the waste packages. If any of these packages has metallic walls, the standing water surrounding them causes the walls to corrode and leak radioactive waste into the ground water. Because such vaults typically have only one access opening, the recoverability of a single, leaking package would be extremely difficult, if not impossible.

While burial sites in which a hardenable substance is poured over a large group of waste containers to form a solid, integral monolith may be more resistant to cracking or breakage due to seismic disturbances, this particular type of disposal site would tend to apply very high, localized stresses on the waste containers located in the paths of any faults or cracks which develop in the monolith. Moreover, this type of site has an even worse problem with recoverability when a seismic disturbance does succeed in rupturing only one or a few of the containers encapsulated within the ground. A relocation of the site might be the only solution if such a cracking or breaking of the inaccessible containers occurred.

To eliminate or at least minimize the tendency of individual containers to crack and break in response to stresses caused by seismic disturbances, nuclear waste disposal sites have been developed by the Westinghouse Electric Corporation which are formed by a solidly packed array of waste-containing modules which are arranged to be flexibly conformable with changes in the shape of the site brought about by seismic events or other natural disturbances. However, while this particular land disposal site represents a clear advance in nuclear waste disposal technology, it, too, has its limitations. For example, because it is a below-ground burial system, it is not well adapted for use in geographical areas having medium to high water tables, which includes much of the eastern United States. In such areas, the burial trench would have to be relatively shallow since the floor of the trench must be constructed well above the level of ground water in the earth. The relatively shallow depth of such a burial site would substantially limit the amount of nuclear waste that a given acreage of the site could hold. As every state government would like its particular toxic waste sites to be as few and as of small an area as possible, the limited amount of wastes such a shallow trench-type burial site could hold poses a significant problem for the use of this kind of site in many areas of the United States. Additionally, any type of underground waste disposal site is always prone to collect significant amounts of standing water as a result of the "bathtub effect" which in turn sets the stage for the possible radioactive contamination of ground water.

Sites for disposing nuclear wastes above ground are also known in the prior art. In such sites, the waste is typically placed in containers, such as 55-gallon drums, and stacked in a compact array above ground in the site. A tumulus, or hill-shaped structure having walls formed by a combination of either poured concrete, or compacted clay, gravel, etc. is then formed over the stacked array of waste canisters. However, while such above-ground waste disposal sites are not prone to the "bathtub effect", they are limited in the amount of wastes which they may contain by the requirement of relatively long tumulus walls that should not have a slope any sharper than about one to four. If the slope of the tumulus walls is made any sharper, the tumulus would become unacceptably vulnerable to the effects of either water erosion or seismic disturbances, which could eventually cause the tumulus walls to lose their integrity. Since the nuclear waste within such a tumulus may not decay radioactively down to a safe level for four to five hundred years, the tumulus walls must be built to last with a high degree of certainty for at least half of a millennium.

Clearly, what is needed is a toxic waste site which is particularly adapted for the disposal of large volumes of low-level nuclear waste in as small an acreage as possible. Ideally, such a site should not be prone to the "bathtub effect", and should be usable in geographic areas where the water table is not unusually low. Finally, it would be desirable if such a site were easy and economical to construct, and resulted in little or no exposure of potentially harmful radiation to during its construction.

SUMMARY OF THE INVENTION

Generally speaking, the invention is an improved waste disposal site for the above-ground disposal of toxic waste, which may be radioactive, that is formed from a plurality of individual, waste-containing tumuli arranged in a pyramidal configuration. Each tumuli includes a central raised portion bordered by a sloping side portion. The site is formed by at least two ground-level tumuli having mutually adjoining side portions, and an above-ground tumulus disposed over the adjoining side portions. Each tumulus includes both a floor and a roof formed in part by a water-shedding deformable layer of material, and the deformable layer of material in the roofs of the ground-level tumuli form at least in part the floor of the above-ground tumulus. Additionally, the roof of each tumulus may include an intrusion barrier formed from a plurality of flexibly interlocking structures. In the preferred embodiment, each of the interlocking structures includes a plurality of legs that mutually interfit with the legs of adjoining structures.

When the improved waste disposal site of the invention is used to dispose of radioactive waste, each tumulus may contain at least one shield wall means for protecting workers from potentially harmful radiation during the construction of the tumulus. The workers may stand behind the shield wall means while stacking an array of non-handleable radioactive waste packages in the center portion of the tumulus. Nuclear waste packages which are of sufficiently low radioactive intensity so as to be handleable may be stacked on the other side of the shield wall. In the preferred embodiment, the shield wall means is, itself, formed from nuclear waste packages whose surface radiation intensity is low enough to be safely handleable by the construction workers. The wall means is formed by simply stacking such low-level waste packages together in a solid array. The resulting wall means is advantageously flexibly conformable with any shifts in the terrain caused by seismic disturbances.

The layer of water-shedding material that forms the floor of each tumulus is preferably circumscribed by a trench which holds a drainage gallery. A deformable layer of drainable material, such as gravel, is placed over the water-shedding layer of material. A plurality of draining troughs are also provided to guide any water which flows through the water-impermeable material into the drainage gallery. Zeolitic materials may be added to the drainable layer to retard the passage of radioactive elements such as cesium.

Radiation detectors may be placed within the drainage gallery in order to monitor the level of radioactive material and any water which collects therein. A valve may further be provided in the drainage gallery for diverting any water which collects therein into a treatment plant in the event that the concentration of radioactive contaminants in the water surpasses a selected level.

In the method of constructing the improved site of the invention, the floors of two ground-level tumuli are constructed close enough together so that the deformable, water-shedding layer of material in the roofs of each will adjoin when the two tumuli are completed. In the preferred embodiment, these water-shedding layers are formed from compacted clay. Next, at least one shield wall means is constructed on one side of the water-shedding material. In the preferred embodiment, two such shield wall means are constructed, and positioned so as to border the raised portion from the side-sloping portion of the tumuli.

The tumulus is next loaded with packages of nuclear waste. The disposal operators first deposit the more-radioactive, non-handleable packages of radioactive waste in the center portion of the tumulus by means of a long-handled crane while they stay behind the shield wall means. After the center portion of the tumulus is completely filled, lower-level packages of handleable radioactive waste is stacked on the other side of the shield wall means in a sloping configuration to define the sloping sidewalls of the tumulus.

Next, a ceiling layer of water-shedding material, such as compacted clay, is placed over the center and side portions of the tumulus. After this has been completed, an intrusion barrier formed from a plurality of flexibly interlocking structure, such as dolos, is placed over the ceiling layer of water-shedding material. To complete the tumulus, another layer of water-shedding material is placed over the intrusion barrier.

The second tumulus is constructed the same as the first. Finally, the third tumulus is constructed above ground the same as the first two, with the notable exception that the deformable, water-shedding layer in the roofs of the first and second tumulus are used to form the deformable water-shedding layer of the floor of the third tumulus.

BRIEF DESCRIPTION OF THE FIGURES

FIG. 1A is a plan view of the pyramiding tumuli waste disposal site of the invention;

FIG. 1B is a cross-sectional side view of the waste disposal site illustrated in FIG. 1A along the lines 1B—1B;

FIG. 1C is a detailed cross-sectional side view of the waste disposal site illustrated in FIG. 1A along the lines 1C—1C;

FIG. 2 is an enlarged cross-sectional side view of the drainage system encircled in FIG. 1C;

FIG. 3 is a side view of the drainage system illustrated in FIG. 2 along the line 3—3;

FIG. 4 is an enlarged view of the drain trough encircled in FIG. 3;

DETAILED DESCRIPTION OF THE PREFERRED EMBODIMENT

Figure 5A:
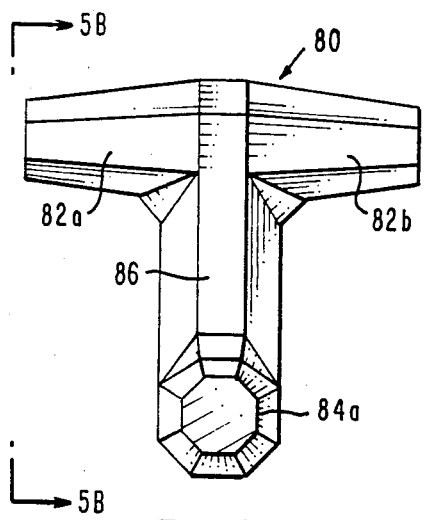
FIG. 5A is a side view of one of the dolos used in the intrusion barrier in each of the tumuli forming the waste disposal site of the invention.

With reference now to FIGS. 1A, 1B and 1C, wherein like numerals designate like components throughout all of the various figures, the improved waste disposal site 1 of the invention generally comprises at least two ground level tumuli 3a, 3b disposed beside one another, and an above-ground tumulus 5 disposed over the mutually adjoining sides of the tumuli 3a, 3b to form a single, shallow pyramidal mound. Each tumulus 3a, 3b and 5 includes a central raised portion 7 that is flanked by a pair of sloping side portions 9a, 9b. The central raised portion 7 is slightly sloped about five degrees or so around its edges to prevent rain water from collecting thereon. By contrast, each side portion 9a, 9b is inclined with a slope of approximately one to four. Such a slope inclination is steep enough to provide a rapid drain off of rain water, yet shallow enough to resist erosion and seismic displacement. Additionally, the length L1 of the central raised portion 7 of each tumulus 3a, 3b and 5 is a little greater than 1/7th of the length L2 of the tumulus as a whole. Such proportioning allows the central raised portion 7 to provide a substantial increase in the amount of storage space available within each tumulus 3a, 3b and 5 without significantly compromising either the water shedding ability or the stability of the tumulus in the event of a seismic disturbance.

Each tumulus 3a, 3b and 5 includes a floor 11 and roof 13 as shown. Each tumulus floor 11 is formed in part from a base layer 15 of a deformable, substantially water-shedding material such as compacted clay. In the method of constructing the improved waste disposal site 1, such a floor base layer 15 of clay will be artificially provided if the base soil 16 is not a substantially water-shedding or water-impermeable type of material. The floor base layer 15 of compacted clay is approximately 1.75 meters thick along its central line, and only about one meter thick at its edge where it abuts the drainage system 35 (discussed in more detail hereinafter). The purpose of providing such an inclination in the base floor layer is to direct any water which might penetrate through the roof 13 of any given tumulus into the particular drainage system 35 associated therewith. The roof 13 of each tumulus 3a, 3b and 5 also includes a deformable layer 17 of a water-shedding or water-impermeable material which may also be compacted clay.

As is best seen with respect to FIG. 1B, the roof layer 17 of compacted clay included in the adjoining sloping side portions 9b and 9a of tumuli 3a and 3b, respectively is advantageously used to form the floor base layer 15 of compacted clay belonging to the above ground tumulus 5. The pyramidal configuration between the two ground level tumuli 3a and 3b and the above ground tumulus 5 has the further advantage of providing a maximum amount of waste volume on a minimum amount of land since the central, above ground tumulus 5 takes no more land than the two ground level tumuli 3a and 3b, and further has a diamond shaped cross-section which allows it to contain twice the volume of waste that can be held in either of the tumuli 3a or 3b.

While only three tumuli 3a, 3b and 5 are shown in the improved waste disposal site 1 of FIGS. 1A and 1B, it would be possible to stack many more such tumuli together in this same pyramidal configuration. Hence, the invention is not confined to the concept of stacking only three tumuli 3a, 3b and 5 into a single large pyramid, but may include any number of such tumuli. In fact, waste capacity efficiencies are realized with pyramidal disposal sites 1 which stack more than three tumuli together, since such sites would include a relatively greater proportion of the higher volume above-ground tumuli 5 (which have a diamond-shaped cross section) relative to the ground level tumuli 3a and 3b (which have only a generally triangular cross section).

Immediately beneath the roof layer 17 of compacted clay in each tumulus 3a, 3b and 5 is an intruder barrier 20. As will be discussed in more detail hereinafter, the barrier 20 is preferably formed from a stack of molded concrete structures called dolos. Each dolo includes a pair of projecting leg members at either end which interlock with the leg members of adjacent dolos when these structures are stacked together. The purpose of the intruder barrier 20 is to prevent intruders from penetrating the roofs 13 of any of the tumuli 3a, 3b and 5 and becoming exposed to the nuclear waste disposed therebelow. Immediately beneath the intruder barrier 20 of each tumulus is a ceiling layer 22 of a deformable, water-impermeable material which again may be compacted clay. This ceiling layer 22 helps to shed any water which might penetrate the roof layer 13 of compacted clay and direct it to the previously mentioned drainage system 35 of the tumulus.

Each tumulus includes a pair of parallel, opposing shield walls 24a and 24b which define the edges of the central raised portion 7 of the tumulus, as well as an array of stacked waste 26. Stacked waste 26 comprises a stack 28 of non-contact waste placed between the two shield walls 24a and 24b, and tapered stacks 30 of contactible waste located beside each of these walls. As used herein, "contactible" waste is characterized by a surface radiation intensity of about 100 millirems per hour or less, whereas non-contactible waste has a surface radiation level of between 100 millirems and 1½ rems per hours. During the construction of each of the tumuli, the disposal operators use the shield walls 24a and 24b to help protect them from potentially harmful radiation when stacking together the relatively more radioactive non-contact waste into the stack 28. The shield walls 24a and 24b may be made from either steel-reinforced concrete, or by a wall-shaped stack of cast-concrete containers which in themselves contain radioactive waste imbedded in concrete so long as the surface radiation of these containers is not substantially higher than ambient background radiation. In this last regard, a preferred type of waste container for use as shield walls 24a, 24b is the Westinghouse Surepak container. Such containers are described in U.S. patent application Ser. No. 627,926, filed July 5, 1984 by Charles Mallory et al and entitled "Modular System for the Stabilization of Radioactive and Hazard Waste Materials for Land Disposal" the entire specification of which is incorporated herein by reference.

Stacked waste 26 in each tumulus rest on top of a layer 32 of a granular, water-permeable substance such as gravel mixed with natural zeolites. This gravel and zeolite layer 32 in turn rests on top of the previously described floor base layer 15 of compacted clay, and performs three important functions. First, this layer 32 is used to form a level floor over the sloped floor base layer 15 of compacted clay over which the waste may be stacked in a vertically straight and stable configuration. Secondly, this layer 32 prevents any water which might penetrate the roof 13 of any of the tumuli from standing around the stacked waste 26 for any significant amount of time. In this last regard, the gravel layer 32 forms an integral part of the previously mentioned drainage system 35 associated with each tumulus. Thirdly, the natural zeolites mixed in with the gravel tend to capture and retain radioactive elements such as cesium, thereby preventing them from leaking out of the tumulus and contaminating surface or ground water.

To keep the various layers of materials in each tumulus separate from one another, a plurality of geotextile separators 41, 43, 45, 47 and 50 are provided. Specifically, separator 41 keeps the floor base layer of compacted clay 15 from intermingling with the gravel layer 32, while the geotextile separator 43 keeps the top of the gravel layer 32 from intermingling with the bottom of the ceiling layer of clay 22. Similarly, geotextile separator 45 separates the tope surface of the stacked waste 26 from the bottom surface of the ceiling layer 22 of clay, while separator 47 keeps the bottom of the intrusion barrier 20 separate from the top surface of the ceiling layer 22 of clay. Finally, geotextile separator 50 keeps the bottom of the roof layer 17 of compacted clay separate from the top surface of the intruder barrier 20. Each of the geotextile separators 41, 43, 45, 47 and 50 is formed from a fiberglass-reinforced sheet of water-permeable plastic in order to assist the layers of clay 15, 17, 22 in their water-shedding function. In the preferred embodiment, the exterior surfaces of each of the tumuli 3a, 3b and 5 are covered with a layer of top soil 52 onto which shallow-rooted vegetation is planted in order to obstruct erosion. The bottom edges of the sloping side portions 9a, 9b of each tumulus terminates in a shallow creek bed 53 which serves to drain rain water away from the central raised portion 7 of the tumuli.

With reference now to FIGS. 1C, 2, 3 and 4, the drainage system 35 associated with each of th tumuli 3a, 3b and 5 is principally formed from the previously mentioned gravel layer 32 and geotextile separator 41 in combination with a drain gallery 55. As may best be seen with respect to FIG. 2, the drain gallery 55 is an elongated conduit of steel-reinforced concrete that has a generally rectangular cross section, and which runs the length L3 of the central raised portion 7 of each tumulus. At least one manhole access shaft 56 is provided between the top surface of the drain gallery 55 and the exterior surface of the tumulus in order to provide access to the interior of the gallery 55. The outlet ends of a plurality of segmentation drain troughs 57 (of which only one is shown) abuts the wall of the gallery 55 which faces the raised, central portion 7 of its respective tumulus. The outlet ends of each of these drain troughs 57 is aligned with a drain port 58 that extends completely through the wall of the gallery 55. Each drain port 58 in turn terminates in a valving fixture 58.1 for controlling the direction of the flow of any water exiting the trough 58. Specifically, the valving fixture 58.1 includes a valve 59 between the port 58 and a sample tap 61, as well as a valve 63 disposed between the drain port 58 and a main drain pipe 65. Normally, valve 59 will be closed and valve 63 opened to allow any water which flows through the segmentation drain troughs 57 to be directed into the main drain pipe 65. However, the valving fixture 58.1 allows a technician who gains access to the interior of the gallery 55 to obtain a sample of the water flowing through the segmentation drain troughs 57 by simply closing the valve 63, and opening the tap valve 59. The resulting water sample may be tested for radioactivity by radiation detector 66 to determine whether or not it is necessary to direct the water flowing through the main drain pipe 65 into a decontamination facility. To facilitate entrance and egress to such a technician, the manhole shaft 56 is provided with a plurality of uniformly shaped manhole rungs 67.

This sampling of water for radioactivity could also be accomplished remotely from a central control (not shown) located on the site by rendering valves 59 and 63 solenoid actuated, and connecting the output of the tap 61 to a conduit leading to the radiation detector 66 in the gallery 55. Such a variation of the preferred embodiment would advantageously allow continuous monitoring and automatic operation.

With reference now to FIGS. 3 and 4, the wall of the gallery 55 which faces the central raised portion 7 of the tumulus further includes a plurality of regularly spaced drain holes 70 for directing water which does not flow through the segmentation troughs 57 into the interior of the gallery 55. These holes 70 are pluggable in the event that the water exiting the segmentation drain troughs 57 becomes radioactive enough (as measured by a plurality of radiation sensors in the gallery 55) to warrant decontamination. When the drain holes 70 are plugged, water flowing through the stacked waste 26 of the tumuli will have to flow through one of the segmentation drain troughs 57 where it may be directed into the main drain pipe 65. As may best be seen with respect to FIG. 4, each of the segmentation drain troughs 57 is formed by a corrugation 72 in the geotextile separator 41 that runs from the center line of the raised central portion 7 of the tumulus to the inner wall of the gallery 55. Each of the corrugations that forms a segmentation drain trough 57 is capped by a cover plate 73 formed from the same material as each of the geotextile separators 41, 43, 45, 47 and 50. Drain holes 75 are provided in the cover plate 73 to facilitate the entry of water into the interior of the corrugation 72. To keep the interior of the corrugation 72 from collapsing, a water permeable filler 77 of gravel is provided therein as shown.

Figure 5B:
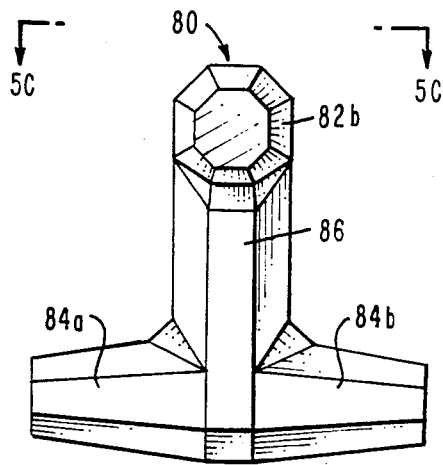
FIG. 5B is another side view of the dolo illustrated in FIG. 5A along the line 5B.
Figure 5C:
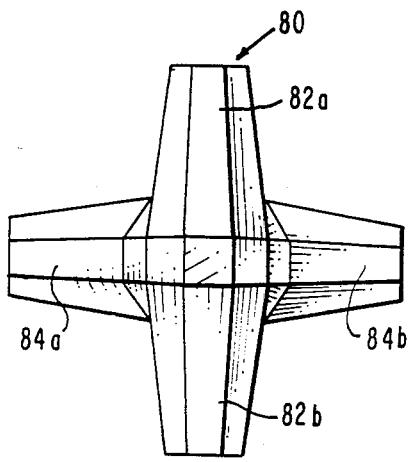
FIG. 5C is a top plan view of the dolo illustrated in FIG. 5B along the line 5C.

With reference now to FIGS. 5A, 5B and 5C, each of the dolos 80 used to form the intrusion barrier 20 includes a pair of upper legs 82a, 82b, and a pair of lower legs 84a, 84b that are connected to one another by means of a connector member 86. The ends of each of the legs 82a, 82b and 84a, 84b are preferably tapered near their extremities so that each of the dolos 80 may be easily molded out of concrete. A steel reinforcement structure (not shown) is included throughout the interior of each of the dolos in order to lend strength thereto. Finally, each of the legs 82a, 82b and 84a, 84b is molded with symmetrical facets around its circumference. The relatively odd shape of the dolos serves three important functions. First, the two-orthogonally disposed sets of legs 82a, 82b and 84a, 84b tend to interlock with the legs of adjacent dolos whenever they are randomly stacked together, thus making it difficult, if not impossible, to penetrate the intrusion barrier 20 formed therefrom without some sort of heavy equipment, such as a crane that could lift out the uppermost dolos one-by-one. Secondly, the unnatural shape of these dolos clearly marks them as a synthetic structure which should prompt any person who inadvertently digs down into the barrier 20 to at least inquire as to the reason for the existence. Thirdly, the odd, leggy shape of the dolos makes them unsuitable for use as building materials, thereby removing any incentive on the part of an inadvertent intruder from using the dolos 80 as a structural material.

Figure 6:
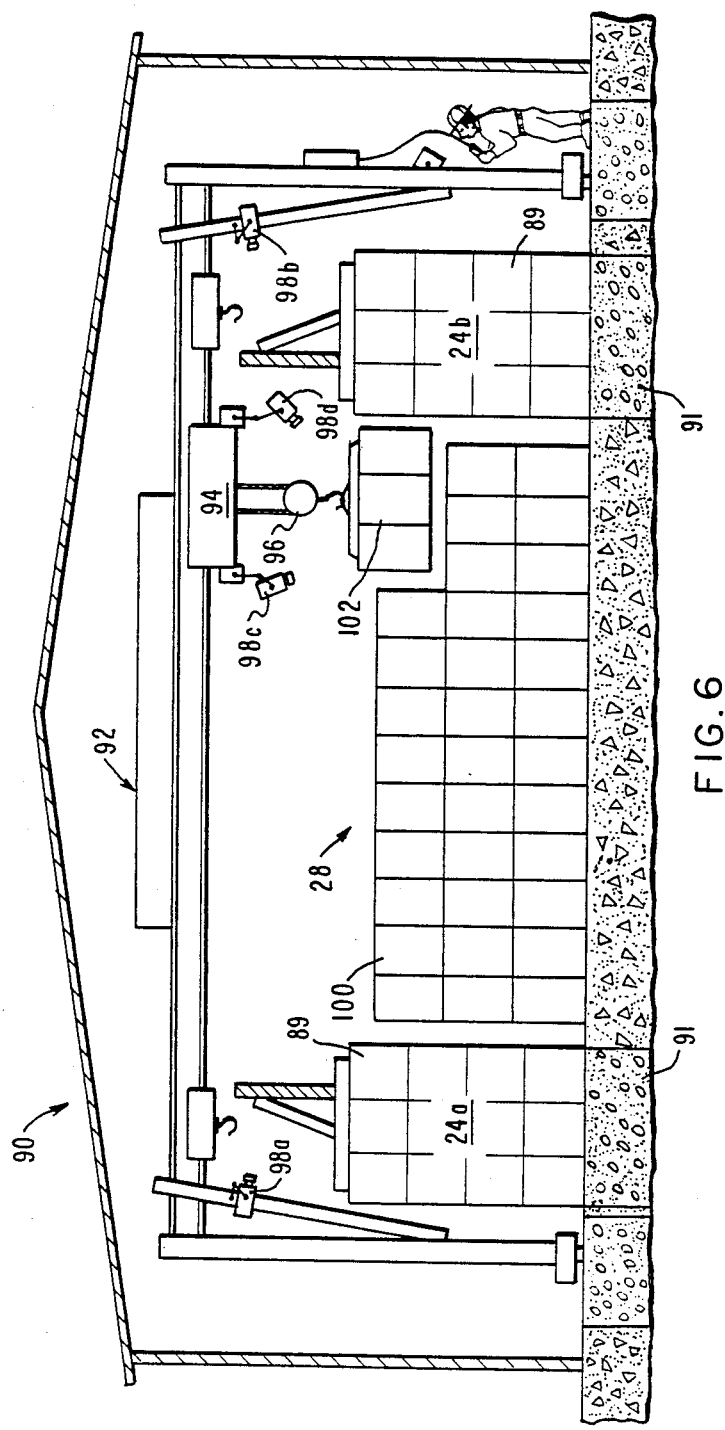
FIG. 6 is a side view of one of the ground level tumuli of the site under construction illustrating how the workers utilize the shield walls to avoid exposure to potentially harmful radiation from the non-contact waste disposed therebetween.

FIGS. 1C and 6 illustrate the method of constructing the tumuli 3a, 3b and 5 for forming the disposal site one of the invention. In the first step of this construction method, a trench system is dug into which the previously described drain galleries 55 may be inserted. Next, if the upper layer of the land is not formed from a substantially impermeable clay-like soil, a floor base layer 15 of compacted clay is brought in from another location and spread over the ground between the trenches where the drain galleries 55 are laid. As has been previously indicated, this floor base layer 15 is not graded level, but is sloped, and three quarters meters high at the center line of what ultimately will be the tumulus, but only three quarters of a meter high along the edge of the gallery 55. After the floor base layer 15 has been graded and compacted, a geotextile separator 41 is spread over it. The previously mentioned segmentation drain troughs 57 are then formed by introducing corrugations in the separator 41, filling them with gravel, and overlaying them with cover plates 73.

In the next step of the construction method, a gravel and zeolite mixture 32 about one meter thick is deposited over the base layer 15 of compacted layer and leveled off. To compensate for the slope of the base layer 15 that it overlies, this gravel layer 32 is about three-quarters of a meter thick along the center line of the tumulus, but is about one and three quarters high near the edge of the tumulus. A geotextile separator 43 is applied over the section of the gravel layer 32 located on the outer edge of the gallery 55.

Next, as may best be seen in FIG. 6, two shield walls 24a, 24b are set in place. As has been previously indicated, the shield walls 24a, 24b may be formed from steel-reinforced concrete, or a stack of Westinghouse Surepak nuclear waste containers 88. A loading facility building 90 is then built over the two shield walls 24a and 24b in the position illustrated in FIG. 6, and a bridge crane 92 is erected therein. The bridge crane 92 includes a trolley 94 for moving a hook and cable 96 over any desired position between the two shield walls 24a and 24b. TV monitoring cameras 98a, 98b, 98c and 98d are further provided on either ends of the bridge crane 92 and on the trolley 94 thereof so that the disposal operators may easily visually monitor the movement of the hook and cable 96 between the walls 24a and 24b.

In the next step of the construction method, non-contact waste is remotely stacked between the two shield walls 24a and 24b by the disposal operators who remotely control the bridge crane 92 at positions behind the walls 24a and 24b. In the preferred embodiment of the method, the non-contact waste is encased in a plurality of 71 gallon square, steel (or stainless steel) drums wherein the mixture of concrete and waste is proportioned to give the drums a surface radiation intensity of no more than one and a half rems per hour. To expedite the stacking operation, clusters 102 consisting of six containers 100 may be stacked by the crane 92.

Once the non-contact waste stack 28 has been completely formed, the bridge crane 92 is removed, and the contact waste stacks 30 are placed into abutment against the outside surfaces of the shield walls 24a and 24b. Sand or other permeable material is then compacted over the tops of the waste containers 100 in order to create a smooth upper surface along the two stacks 28 and 30, and a geotextile barrier 45 is applied thereover. Next, the ceiling layer 22 of compacted clay is laid over the geotextile separators 43 and 45, and a further geotextile separator 47 is overlaid over it. The intrusion barrier 20 is then formed by stacking at least one layer of dolos 80 over the geotextile separator 47. In order to give the top surface of the intrusion barrier 20 some degree of smoothness, gravel or sand or some other water-permeable material may be deposited over the top surfaces of the dolos 80.

In the final stages of the construction method, a final geotextile separator 50 is placed over the intrusion barrier 20, and the previously mentioned roof layer 77 of clay is compacted over the separator 50. Finally, a layer of top soil 52 is placed over the roof layer 17 of clay and shallow-rooted vegetation is planted therein in order to render the top soil layer erosion-resistant.

When one section length of the shield walls is filled and completed, a new section length of the same tumulus can be started while the completed section length is being formed into a tumulus. Additional tumuli can be formed or added onto those already constructed over a long period of time. All tumuli do not have to be started at the same time, and a new tumulus section length can be started at any point along the tumulus line or even along a new tumulus line. Hence the pyramidal configuration of tumuli offers many construction options, and hence has the advantage of being readily tailored to fit additional disposal demands. Also, the use of such tumuli is not confined exclusively to low-level nuclear wastes, but may be used to dispose of high-level wastes such as depleted core subassemblies, other types of toxic wastes, and even "mixed" nuclear and toxic chemical wastes.

What is claimed is:

1. An improved waste disposal site for the above-ground disposal of radioactive wastes which is formed from a plurality of individual, waste-containing tumuli, wherein each tumuli includes a central raised portion bordered by a sloping side portion, comprising at least two ground-level tumuli having mutually adjoining side portions, and an above-ground tumulus disposed over the adjoining side portions, wherein each tumulus includes a deformable floor and roof in order to render each tumulus flexibly conformable with the surrounding terrain in the event of a seismic disturbance, and the roofs of the ground-level tumuli include both an intrusion barrier formed from a plurality of flexibly interlocking structures, and a deformable layer of water-shedding material that forms at least part of the floor of the above-ground tumulus, and wherein each tumulus contains at least one shield wall means for protecting workers from potentially harmful radiation when said tumulus is constructed.

2. An improved waste disposal site as defined in claim 1, wherein each of said interlocking structures includes a plurality of legs, and a connector member for interconnecting said legs.

3. An improved waste disposal site as defined in claim 1, wherein each tumulus contains radioactive wastes of greater and lesser radioactivity which are positioned on different sides of said shield wall means.

4. An improved waste disposal site as defined in claim 1, wherein the slope of each of the side portions of the tumuli is at least one to four.

5. An improved waste disposal site as defined in claim 1, wherein said shield wall means is formed from a flexibly conformable array of wall components.

6. An improved waste disposal site as defined in claim 5, wherein each of said wall components is a container that holds nuclear wastes, wherein the radiation intensity at the surface of each container is no greater than about 100 millirems/hour.

7. An improved waste disposal site for the above-ground disposal of radioactive wastes which is formed from at least three individual, waste-containing tumuli, wherein each tumulus has a deformable floor and roof for rendering each tumulus flexibly conformable with the surrounding terrain in the event of a seismic disturbance, each of which includes a water-shedding, deformable layer of material, said roof also including an intrusion barrier formed from a plurality of flexibly interlocking structures, and the water-shedding, deformable layer of material of the roof of one tumulus forms at least in part the water-shedding, deformable layer of material of the floor of another tumulus, and wherein each tumulus contains at least one shield wall means for protecting workers from potentially harmful radiation when said tumulus is constructed.

8. An improved waste disposal site as defined in claim 7, wherein the roof of each tumulus includes a central raised portion bordered by a sloping side portion.

9. An improved waste disposal site as defined in claim 8, wherein the slope of each said side portion is about one to four.

10. An improved waste disposal site as defined in claim 7, wherein each of said structures includes a plurality of legs which interfit with the legs of adjacent structures.

11. An improved waste disposal site as defined in claim 7, wherein each tumulus contains radioactive wastes of greater and lesser radioactivity which are positioned on different sides of said shield wall means.

12. An improved waste disposal site as defined in claim 7, wherein said water-shedding deformable layer of both said roof and said floor is formed from compacted clay.

13. An improved waste disposal site as defined in claim 7, wherein each floor further includes a layer of water-permeable material that contains natural zeolites to retard the passage of radioactive chemicals through said layer.

14. An improved waste disposal site as defined in claim 13, further including a plurality of drainage conduits disposed at the bottom of said layer of water-permeable material for collecting and directing water to a drainage gallery means.

15. An improved waste disposal site for the above-ground disposal of radioactive wastes comprising a plurality of individual, waste-containing tumuli, each tumulus including a deformable floor and deformable roof for rendering each tumulus flexibly conformable with the surrounding terrain in the event of a seismic disturbance, wherein said floor is formed in part by a deformable layer of water-shedding material, and said roof is likewise formed in part by a deformable layer of water-shedding material, and said roof further includes an intrusion barrier formed from a plurality of flexibly interlocking structures and has a central raised portion, wherein said site includes at least two ground-level tumuli having mutually adjoining side portions, and an above-ground tumulus disposed over the adjoining side portions whose floor is formed in part by the water-shedding deformable layer of material in the roofs of the ground level tumuli, and wherein each tumulus contains at least one shield wall means for protecting workers from potentially harmful radiation when said tumulus is constructed.

16. An improved waste disposal site as defined in claim 15, wherein each floor further includes a layer of water-permeable material disposed on top of its water-shedding deformable layer of material, wherein said water permeable layer contains natural zeolites to retard the passage of radioactive chemicals through said layer.

17. An improved waste disposal site as defined in claim 16, further including a plurality of drainage conduits disposed at the bottom of said layer of water-permeable material for collecting and directing water to a drainage gallery means.

18. An improved waste disposal site as defined in claim 17, further including a radiation detecting means for detecting the level of radiation of said water in said gallery means.

19. An improved waste disposal site as defined in claim 18, wherein said gallery means includes a valve means for diverting the water therein to a treatment plant in the event the radioactivity of the water collected in the gallery means exceeds a selected value.

20. A pyramidal array of tumuli for the above-ground disposal of radioactive wastes, comprising at least two ground-level tumuli and one above-ground tumulus, each having a deformable floor and a roof for rendering each tumulus flexibly conformable with the surrounding terrain in the event of a seismic disturbance, wherein each said floor and roof includes a deformable layer of water-shedding material, and said roof of each includes a ceiling formed from another deformable layer of water-shedding material, and an intrusion barrier disposed between said deformable layers of water-shedding material in said roof and ceiling that is formed from a plurality of flexibly interlocking structures, as well as a central raised portion bordered by a sloping side portion which is supported by an array of nuclear waste packages, and wherein each tumulus contains a shield wall means for protecting workers from potentially harmful radiation during the construction of the array.

21. A pyramidal array of tumuli as defined in claim 20, wherein the floor of each tumulus includes a layer of water-permeable material for supporting said array of nuclear waste packages and draining any water that should collect around said packages.

22. A pyramidal array of tumuli as defined in claim 21, wherein each tumulus includes a plurality of drainage conduits disposed at the bottom of said layer of water-permeable material for collecting and directing water to a drainage gallery means.

23. A pyramidal array of tumuli as defined in claim 22, wherein each tumulus includes a radiation detecting means for detecting the level of radiation of said water in said gallery means, as well as a valve means for diverting the water in said gallery means to a treatment plant in the event that the radioactivity of the water collected in the gallery means exceeds a selected value.

24. A method of constructing a site for the above-ground disposal of radioactive wastes, comprising the steps of a. constructing a deformable floor for a first tumulus that includes a deformable layer of water-shedding material;
b. constructing a shield wall means on said floor capable of blocking radiation from said wastes;
c. depositing an array of packages containing radioactive wastes over said floor and behind said shield wall;
d. constructing a deformable roof over the array of waste packages which includes a deformable layer of water-shedding material, and an intrusion barrier beneath the deformable layer of water-shedding material, said barrier being constructed by overlaying the array of waste packages with a plurality of flexibly interlocking structures;
e. constructing a second tumulus in accordance with steps a-d which is close enough to the first tumulus so that the deformable layers in the roofs of the first and second tumuli adjoin one another; and
f. constructing a third tumulus over the roofs of the first and second tumuli in accordance with steps a-d wherein the mutually adjoining, deformable layers of water-shedding material in said roofs provide the deformable layer of water-shedding material of the floor of the third tumulus.

25. A method of constructing a site for the aboveground disposal of [toxic] radioactive wastes as defined in claim 32, wherein said waste packages contain radioactive wastes, and the surface radiation intensity of some of said packages is higher than others.

26. A method of constructing a site for the aboveground disposal of [toxic] radioactive wastes as defined in claim 25, wherein [the disposal operators load] the waste packages of higher surface radiation intensity are loaded behind the shield wall means when [depositing] said array of packages are deposited over said tumulus floor in order to minimize [their exposure to] the amount of radiation radiated toward persons in the area.

* * * * *